Oct. 23, 1956   W. W. GATES   2,767,643
CIDER MILL
Filed July 28, 1952   2 Sheets-Sheet 1
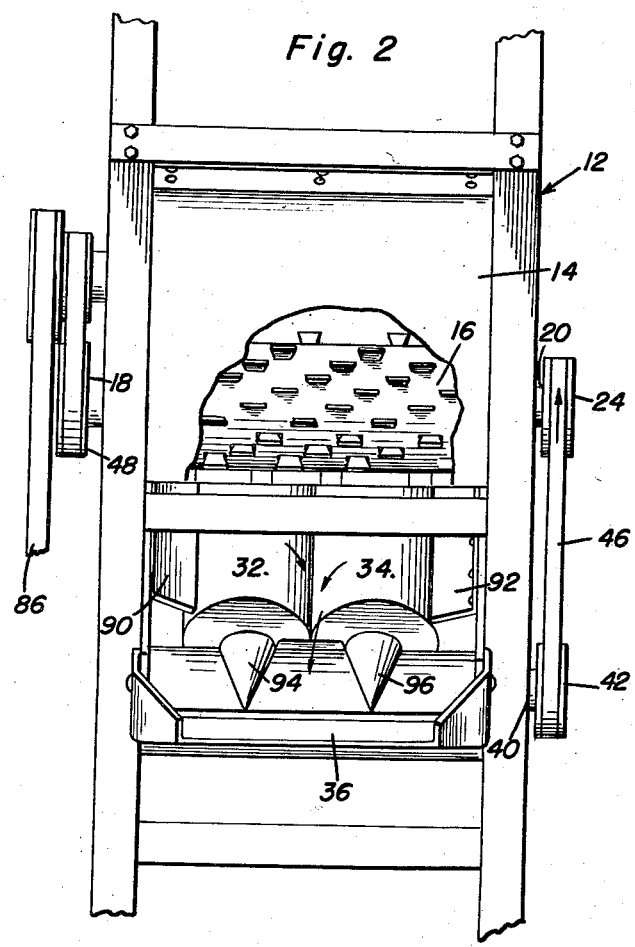
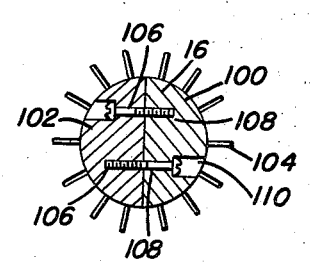
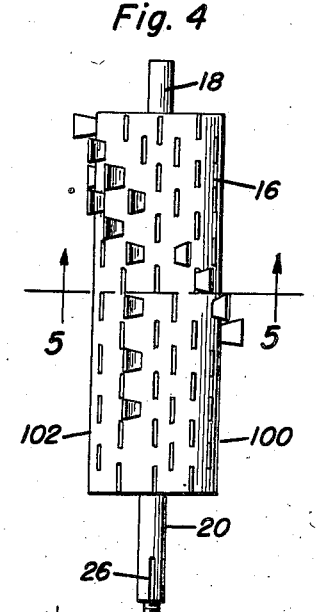
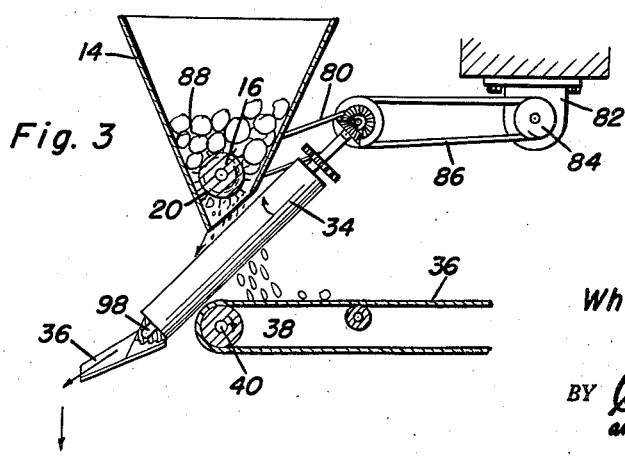
Wheaton W. Gates
INVENTOR.
BY Clarence A. O'Brien
and Harvey B. Jacobson
Attorneys

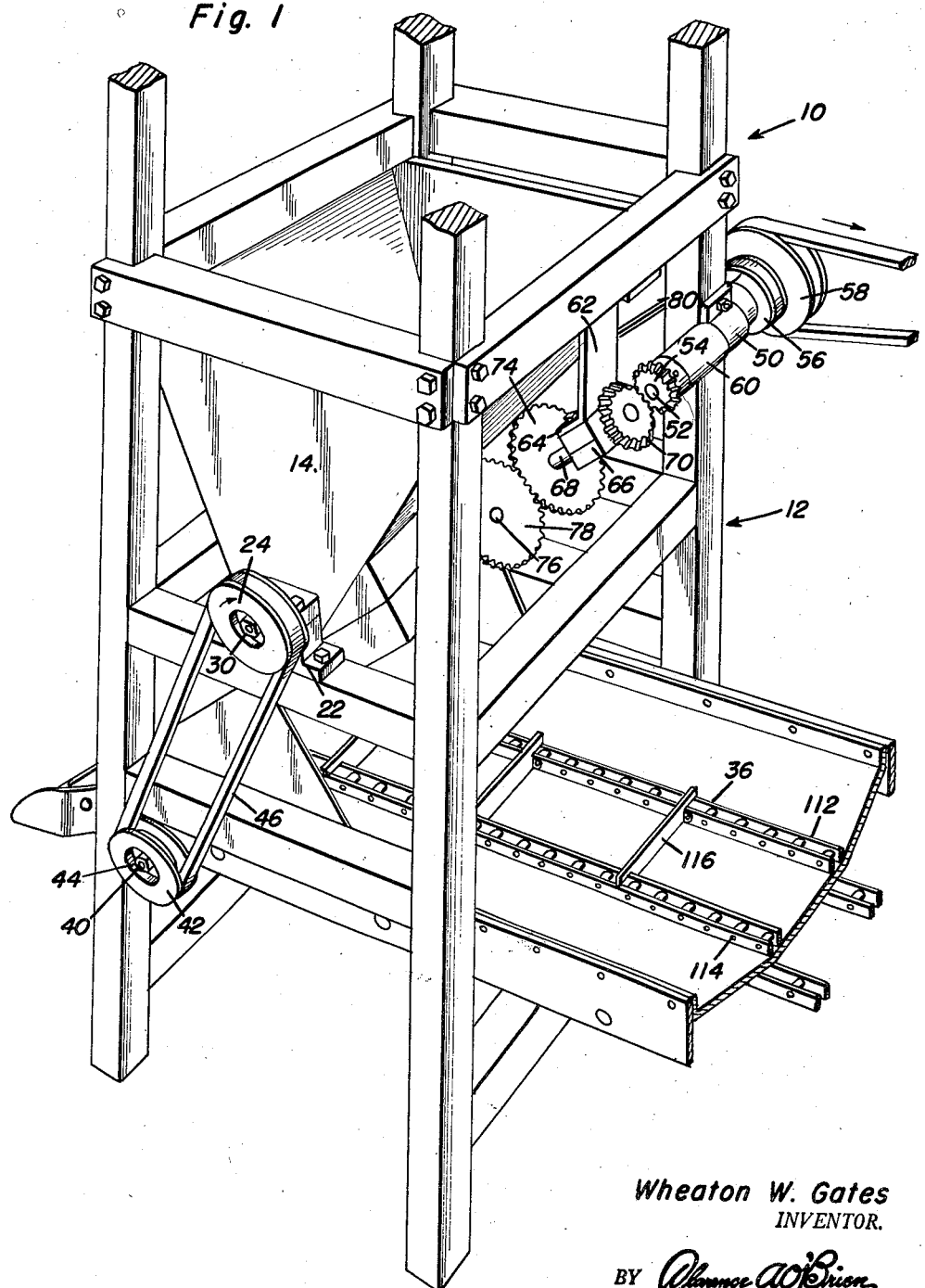

United States Patent Office 2,767,643
Patented Oct. 23, 1956

2,767,643

CIDER MILL

Wheaton W. Gates, Chico, Calif.

Application July 28, 1952, Serial No. 301,249

5 Claims. (Cl. 100—96)

The present invention relates to cider mills and it is primary object of the invention to provide a cider mill that will have increased capacity over similar mills presently in use.

It is another object of the invention to provide a cider mill in which the grinding rollers or rolls of the mill are set at an angle to the mill hopper whereby the juice from the pressed fruit is permitted to run down these rolls into a drain board while pulp is simultaneously being ground to pomace by the grinding rollers.

Yet another object of the invention is to provide a cider mill that will reduce the fruit pulp to a dry pomace and which includes means for carrying the dried pomace away from the mill.

These, together with various ancillary objects and features of the invention which will later become apparent as the following description proceeds, are achieved by the present cider mill, a preferred embodiment of which is shown by way of example only in the accompanying drawings, wherein:

Figure 1 is a perspective view of the cider mill in its entirety;

Figure 2 is a front view of the cider mill, with parts of the hopper being shown broken away to show the internal details thereof;

Figure 3 is a side view of the cider mill with the frame being omitted therefrom and the hopper and the conveyor being shown in section;

Figure 4 is a top view of the crushing roll per se; and

Figure 5 is a sectional view of the crushing roll taken substantially along section line 5—5 of Figure 4.

Referring now to the accompanying drawings in detail, it will be noted that like reference numerals are utilized to designate similar parts throughout the various views.

In the preferred embodiment illustrated in the drawings, the cider mill is indicated in its entirety by the numeral 10 and is shown as comprising a suitable frame 12 within the confines of which is mounted a hopper 14. Within the hopper 14 adjacent the bottom thereof is mounted a crushing roll 16 having axial stub shafts 18 and 20 extending from opposite ends thereof, the stub shafts 18 being rotatably journaled in one end wall of the hopper 14 while the stub shaft 20 is also rotatably journaled in one end wall of the hopper 14 and extends through the hopper and is rotatably journaled on the frame 12 by means of a journal bearing 22. A pulley 24 is keyed onto the end of the stub shaft 20 by way of keyway 26 in the stub shaft 20, the stub shaft 20 having a reduced, threaded end portion 28 receiving a nut 30 to secure the pulley 24 thereon.

The bottom of the hopper 14 is open to allow for the passage of fruit therethrough. Mounted on the frame beneath the hopper 14 and disposed at angle to the vertical, or, in other words, being downwardly inclined from the hopper 14 are a pair of parallel, closely adjacent grinding rolls 32 and 34. Mounted on the frame at the lower ends of the grinding rolls 32 and 34 is a drain board 36 for receiving juices which flow along the downwardly inclined grinding rolls 32 and 34.

Mounted on the frame beneath the grinding rolls 32 and 34 is a horizontally extending endless conveyor 36 for transporting pomace which is ground between the grinding rolls away from the cider mill. The endless conveyor 36 is entrained at one end around a driving roller 38 which has a stub shaft 40 extending from one end thereof. Fixedly secured to the end of the stub shaft 40 is a pulley 42 which is disposed exteriorly of the frame 12 beneath the pulley 24 on the stub shaft 20 of the crushing roll 16. A nut 44 threaded onto the end of the stub shaft 40 maintains the pulley 42 thereon. A belt 46 is entrained around pulleys 24 and 42 to drivingly interconnect the same.

Referring now particularly to Figure 2, it will be seen that the stub shaft 18 extending axially from one end of the crushing roll 16 is disposed exteriorly of the frame 12 on the opposite side of the frame from the stub shaft 20. Fixedly secured to the stub shaft 18 is a pulley 48 for driving the crushing roll 16 and consequently, through pulley 24, driving the endless belt conveyor 36.

Journaled at the rear of the frame 12 by journal bearing 50 is a transversely extending shaft 52 which has a bevel gear 54 secured to the inner end thereof and a pair of pulleys 56 and 58 secured to the outer end thereof. Spacing sleeve 60 maintains the bevel gear 54 against movement toward the journal bearing 50.

Adjacent the bevel gear 44 and mounted on the upper portion of the rear of the frame 12 is a depending bracket 62 having an angulated lower end 64 upon which a journal bearing 66 is secured. The angle of the lower portion 64 of the bracket 62 and consequently that of the journal bearing 66 is the same as the downwardly inclined angle of the grinding rollers 32 and 34 which angle should be approximately 45° to afford the best operation of the mill. Extending axially from the upper end of grinding roll 32 and rotatably journaled in the bearing 66 is a stub shaft 68 upon the outer end of which is secured a bevel gear 70, which gear is in meshing engagement with the bevel gear 54. Intermediate the grinding roll 32 and the bevel gear 70, a toothed ring gear 74 is secured to the stub shaft 68. Extending from the upper end of the grinding roll 34 is a stub shaft 76, upon the outer end of which is secured a toothed ring gear 78 in meshing engagement with the ring gear 74. Thus, it can be seen that upon rotation of the bevel gear 70 by the rotation of bevel gear 52, both of the grinding rolls 32 and 34 will be rotated. Belt 80 is entrained over pulley 56 and pulley 48.

In any suitable position with respect of the cider mill frame 12, or on the cider mill frame 12 itself, may be mounted a motor 82 such as shown in Figure 3 having a drive pulley 84 thereon. A pulley belt 86 interconnects the drive pulley 84 with the driven pulley 58 to rotate the shaft 52 and thereby cause the operation of the cider mill. In operation, the pulley 58 is turned in a clockwise direction whereby the grinding rolls 32 and 34 will be rotated toward one another so that material dropped on the top surfaces thereof will be drawn therebetween. Also, such clockwise movement of the pulley 58 will cause the crushing roll 16 to turn in a clockwise direction as shown in Figure 3 to cause the fruit such as apples or the like 88 to be crushed between the rear wall of the hopper and the crushing roll so that the pulped fruit will be disposed as far up as possible on the grinding rolls 32 and 34. Also, with such rotation of the roll 16, the endless conveyor will have its upper run moving away from the frame and the drain board 36.

To remove any pomace which may tend to stick to the grinding rolls 32 and 34 scraper blades 90 and 92 are mounted on the frame in contacting engagement with the roll surfaces to scrape the pomace therefrom onto the conveyor 36.

As the pulp dispensed from the hopper through the crushing rolls 16 is disposed or falls to the grinding rolls 32 and 34, the initially extracted juice from this operation runs down the grinding rolls and is channeled onto the drain board 36 from whence it is collected. As the pulp created by the crushing roll 16 is ground to pomace between the grinding rolls 32 and 34, the additionally extracted juice formed in this operation also runs down the inclined grinding rolls 32 and 34 to the drain board 36 and the pomace, being substantially dried having all the juice extracted therefrom, falls through the rolls 32 and 34 onto the endless conveyor 36 from whence it is conveyed to any convenient container (not shown).

To secure the lower ends of the grinding rolls 32 and 34, the inner end of the drain board 36 is formed with raised bosses 94 and 96 respectively into which the shafts 98 extending from the lower end of the rolls 32 and 34 rotatably extend. Note this last mentioned feature in Figure 3.

Referring now to Figures 4 and 5, the particular construction of the crushing roll 16 will be readily observed whereby the same may be quickly and simply installed in the hopper 14 and removed from the same for cleaning or replacement. As shown in these figures, the crushing roll 16 comprises a pair of complementary, semi-cylindrical members 100 and 102, each of these sections having radially extending lugs on the outer surfaces thereof for spearing and crushing fruit 88 as it passes through the hopper. Fasteners 106 disposed in aligned bores 108 formed in the complementary sections 100 and 102 secure these sections together. Each section 100 and 102 is further provided with a counterbore in the outer surface thereof evidenced by the numeral 110 communicating with the complementary or aligned bars 108 for receiving the head of a fastener 106.

The conveyor structure 36 is also somewhat especially constructed as will be seen in Figure 1. This conveyor structure comprises a pair of spaced, parallel endless chains 112 and 114 having spacers 116 extending therebetween. The upper run of the conveyor is guided and supported on a supporting plate 118 which plate is in turn mounted at its flanged edges 120 to the bars 122 secured to opposite sides of the frame 12.

Suitable modifications may occur to one skilled in the art and may be considered to fall within the scope of the appended claims.

Having described the invention, what is claimed as new is:

1. A cider mill comprising a frame, a hopper mounted on said frame, a crushing roll disposed in said hopper and a pair of grinding rolls mounted on said frame beneath said hopper, said grinding rolls being inclined from the horizontal, said crushing roll extending transversely across said grinding rolls and being disposed below the upper ends thereof.

2. A cider mill comprising a frame, a hopper mounted on said frame, a crushing roll disposed in said hopper and a pair of grinding rolls mounted on said frame beneath said hopper, said grinding rolls being inclined from the horizontal, said crushing roll extending transversely across said grinding rolls and being disposed below the upper ends thereof, the walls of said hopper tapering toward said crushing roll adjacent the lower end of the hopper, teeth on said crushing roll for crushing fruit between a wall of the hopper and the crushing roll.

3. A cider mill comprising a frame, a hopper mounted on said frame, a crushing roll disposed in said hopper and a pair of grinding rolls mounted on said frame beneath said hopper, said grinding rolls being inclined from the horizontal, said crushing roll extending transversely across said grinding rolls and being disposed below the upper ends thereof, a conveyor disposed beneath said grinding rolls, said conveyor extending longitudinally of said grinding rolls, said conveyor including a conveyor drive shaft extending parallel to said crushing roll, pulleys on said conveyor shaft and said crushing roll, an endless belt interconnecting said pulleys.

4. A cider mill comprising a frame, a hopper mounted on said frame, a crushing roll rotatably mounted in said hopper, and a pair of grinding rolls mounted on said frame beneath said hopper, said grinding rolls being longitudinally inclined from the horizontal, said crushing roll being disposed transversely to said grinding rolls below the upper ends of said grinding rolls, and drive means operatively connecting said rolls.

5. A cider mill comprising a frame, a hopper mounted on said frame, a crushing roll rotatably mounted in said hopper, and a pair of grinding rolls mounted on said frame beneath said hopper, said grinding rolls being longitudinally inclined from the horizontal, said crushing roll being disposed transversely to said grinding rolls below the upper ends of said grinding rolls, and drive means operatively connecting said rolls, a conveyor disposed beneath said grinding rolls, said conveyor extending longitudinally of said grinding rolls, said conveyor including a conveyor drive shaft extending parallel to said crushing roll, pulleys on said conveyor shaft and said crushing roll, and an endless belt interconnecting said pulleys.

References Cited in the file of this patent

UNITED STATES PATENTS

| Re. 2,499 | Fassler et al. | Feb. 26, 1867 |
| 160,397 | Curtiss | Mar. 2, 1875 |
| 235,198 | Bell | Dec. 7, 1880 |
| 1,188,084 | Kreitzer | June 20, 1916 |
| 1,180,608 | Sauerman | Apr. 25, 1916 |
| 1,188,084 | Kreitzer | June 20, 1916 |
| 1,386,207 | Sissal | Aug. 2, 1921 |
| 2,145,980 | Hadwiger et al. | Feb. 7, 1939 |

FOREIGN PATENTS

| 64,399 | Switzerland | Apr. 18, 1913 |
| 172,358 | Great Britain | Dec. 5, 1921 |